Jan. 31, 1967  G. REINECKE  3,301,550
APPARATUS FOR THE PRODUCTION OF A LATERAL SPACING BETWEEN
A PLURALITY OF ADJACENT CUTS PRODUCED BY LONGITUDINAL
AND CROSS CUTTING OF A LENGTH OF MATERIAL
Filed April 27, 1965
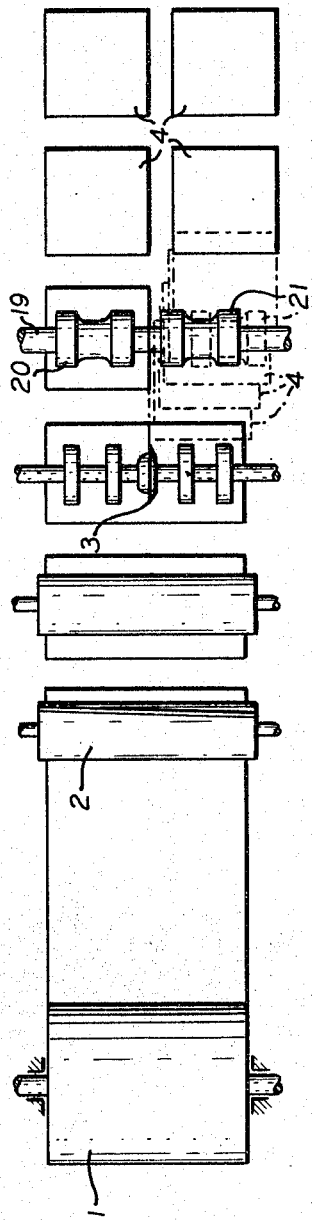
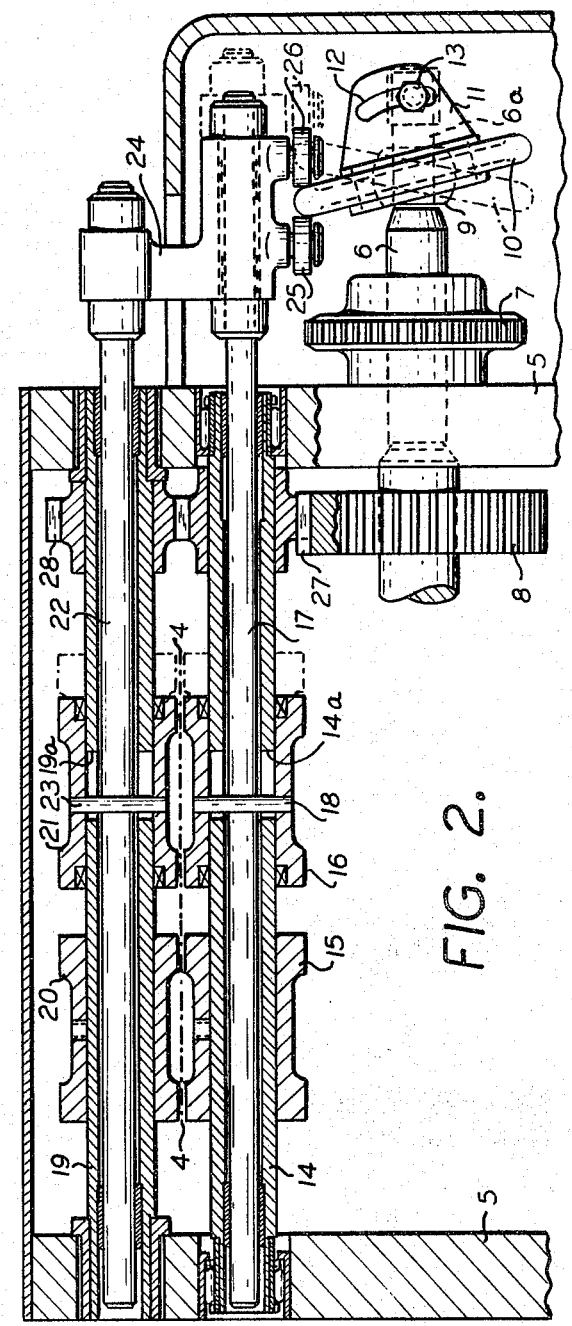
INVENTOR
GÜNTER REINECKE
BY
ATTORNEY.

United States Patent Office 3,301,550
Patented Jan. 31, 1967

3,301,550
APPARATUS FOR THE PRODUCTION OF A LATERAL SPACING BETWEEN A PLURALITY OF ADJACENT CUTS PRODUCED BY LONGITUDINAL AND CROSS CUTTING OF A LENGTH OF MATERIAL
Gunter Reinecke, Wuppertal-Elberfeld, Germany, assignor to Benz & Hilgers G.m.b.H., Dusseldorf, Germany, a corporation of Germany
Filed Apr. 27, 1965, Ser. No. 451,256
5 Claims. (Cl. 271—51)

The present invention relates to an apparatus for the production of a lateral spacing between a plurality of adjacent cuts by longitudinal and cross cutting of a length of material, in general, and to such apparatus wherein a separating member turning in the conveyance plane of the cut, in particular.

If, for instance, a length of material is taken from a roll of paper and the length of material is divided into a plurality of strips by means of longitudinal cutters, in order to protect the longitudinal edges of these strips, the necessity of the provision of a lateral spacing between the individual strips arises.

In most of the instances a narrow slit will suffice, which in accordance with a known apparatus is produced by running of strips against a drum equipped with spiral threads. On the other hand, it is also known to provide immovable wedges between the separating slits of the strips immediately behind the longitudinal cutting knives, in relation to the direction of conveyance. In all these cases it will be required that the members providing further treatment of the strips take care for the retaining of the spacings between the lengths of material by relative spacings.

It is apparent that in order to avoid tensions and material accumulations during buckling of a length of material, the width of the spacings of the lengths has narrow limits. With the known separating means wider spacings between the lengths of material can be obtained only by means of a corresponding extension of the separating path. Such space requiring measure can be realized, as a matter of course, only in a machine, which itself has appreciable dimensions.

For this reason, for instance, in a packaging machine, in which a plurality of filling goods are packaged simultaneously and, thus a plurality of packaging lines are present, the performance takes place such that the packaging cut belonging to a particular packaging line is taken from an individual roller and is fed cross-divided to the packaging machine. The disadvantages of the multiple arrangement of rollers reside first of all in the fact, that each individual roller must be threaded into the machine with its start of the length of the material, that it requires a particular control which holds the line and that it also requires an observation of the roller end, so that the run-out roller can be replaced timely by a new roller.

Between manually operable machines and automatically operable machines concerning the multiple arrangement of the rolls of material, the difference resides only in the higher expenses, which difference can be composed of labor or of additional construction means.

It is one object of the present invention to provide an apparatus for the production of a lateral spacing in a plurality of adjacent cuts produced by longitudinal cross cutting of the length of material, wherein, instead of the disadvantageous multiple arrangement of the material rollers, an apparatus is created, in which different packaging lines are served with cuts from a joint roll of material, whereby these cuts obtain by the shortest separation path, a selectively large lateral distance.

It is another object of the present invention to provide an apparatus for the production of a lateral spacing between a plurality of adjacent cuts produced by longitudinal and cross cutting of a length of material, which includes a plurality of pairs of feeding rollers disposed in series, which rollers perform in addition to their rotary movement, a controllable axial displacement, with the exception of one of the pairs of the rollers. The pairs of feeding rollers are for this purpose adjusted to the length and feeding distances of the cuts, so that the individual pair performs during one rotation, by joining one cut, the axial displacement required for the formation of the lateral spacing and returns to its original position during the feeding distance of two successive cuts.

With these and other objects in view, which will become apparent from the following detailed description, the present invention will be clearly understood in connection with the accompanying drawings, in which:

FIGURE 1 is a schematic top plan view of the path of a length of material of the roller up to the individual cut; and FIG. 2 is a longitudinal vertical section of the feeding rollers jointly with their control means.

Referring now to the drawings, the embodiment disclosed by example in the drawings, comprises a roller 1 carrying material as paper, from which one length of material is taken off and the latter is then cut into individual length sections by means of a cross cutting device 2.

The sections are now fed, after being cut into halves by means of a longitudinal cutter 3, as finished cuts 4 to the actual feeding and individualization device, which is disposed with its feeding members in the plane of the cut. The device comprises substantially two frame parts 5 with a drive shaft 6, a chain gear 7 and a toothed gear 8, furthermore, a ball-shaped member 9 mounted on the drive shaft 6, the ball-shaped part 9 carrying a disk 10 running out of truth. The drive shaft 6 has a shaft end 6a formed as a square, which is surrounded on opposite sides by a double flange 11 having curved slots 12, which slots receive a bolt 13, which is mounted in a bore of the shaft end 6a.

Two hollow shafts 14 and 19 are rotatably mounted in superposed position closely to each other in the frame parts 5 above the drive shaft 6, and a pair of feeding rollers 15 and 20 are secured to the hollow shafts 14 and 19. A second pair of feeding rollers 16 and 21 sits, however, loosely on the hollow shafts 14 and 19, yet joins the rotary movement such, that the feeding roller 16, as well as the roller 21 are equipped with a coupling member 18 and 23, respectively, which project through a longitudinal slot 14a and 19a, respectively, extending through the hollow shaft 14 and 19, respectively.

The coupling members 18 and 23 also join a loosely mounted control shaft 17 and 22, respectively, for rotation, which control shaft is loosely mounted in the hollow shafts 14 and 19. Both control shafts 17 and 22 are connected together outside of the frame 5 by a common control head 24, rollers 25 and 26, which are disposed such, that the outer face of the disk 10 engages simultaneously at one point both rollers 25 and 26. The drive for all feeding rollers 15, 16, 20 and 21 is brought about by means of the chain gear 7 over a toothed gear 8, which meshes the toothed gears 27 and 28 mounted on the hollow shafts 14 and 19.

The operation of the apparatus designed in accordance with the present invention is performed in the following manner:

The cuts 4 disposed adjacent each other and formed by the cross and longitudinal cutters run between the flatly engaging pairs of feeding rollers 15, 20 and 16, 21.

The cut 4 passing the pair of rollers 15 and 20 maintains its direction of conveying, while the cut 4 gripped by the pair of feeding rollers 16 and 21, is not only conveyed, but also displaced with an increasing parallel disposed lateral distance relative to the first mentioned linearly fed cut 4. The amount of this displacement depends upon the deflection of the disk 10 and the axial displacement of the control head resulting therefrom, upon the control shafts 17 and 22, and finally upon the pair of feeding rollers 16 and 21, guided in the longitudinal slot 14a. In this manner a selectively wide distance between the cuts can be brought about in the shortest way, whereby it is assured by the forced guidance of the cuts 4, that they can be fed simultaneously and exactly aligned to the next operational step. After the cut 4 has been freed from the pair of feeding rollers 16 and 21, the return movement of this pair of rollers 16 and 21 into their original position takes place during the short feeding interval or pause, in which the next following cut has not yet reached the pair of feeding rollers 16 and 21.

The amount of the axial displacement depends upon, as already stated, the deflection angle of the disk 10. This angle can be varied in a simple manner, such that upon lifting the bolt 13, the disk 10 can be swung out about its pivot point within the range of the slot 12 and then again secured in the adjusted position by means of the bolt 13.

It is to be understood that in accordance and within the framework of the present invention, the feeding and separation of more than two adjacent disposed cuts is possible. In case of three cuts, for instance, the two outer cuts will be set off from the median, linearly moved cut, whereby on both sides a deflection disk 10 and a control head 24 with two control shafts 17 and 22 will be required. The connection bringing about the transmission of forces can be obtained also such that instead of a deflection disk 10, for instance, a drum cam can be provided which conveys to the roller mounted on the control head the required reciprocating movement.

While I have disclosed one embodiment of the present invention, it is to be understood that this embodiment is given by example only and not in a limiting sense, the scope of the present invention being determined by the objects and the claims.

I claim:
1. An apparatus for the production of a lateral spacing between a plurality of adjacent cuts produced by longitudinal and cross cutting of a length of material, comprising
separating members rotating in the plane of conveyance, said separating members comprising a plurality of coaxially disposed pairs of feeding rollers,
means for rotating said pairs of feeding rollers, and
means for subjecting at least one of said pairs of feeding rollers to a variable axial displacement while said pairs of feeding rollers are simultaneously rotating.
2. The apparatus, as set forth in claim 1, wherein
the periphery of said pairs of rollers is adjusted to the length of the cuts to be conveyed such that one of said pairs of rollers performs the axial displacement during its rotation, and said one of said pairs of rollers returns to its initial position during a feeding interval determined by the distance between two successive cuts to be conveyed by said one of said pairs of rollers.
3. The apparatus, a set forth in claim 1, which includes a plurality of parallel disposed and jointly driven hollow shafts,
at least one of said pairs of feeding rollers is secured to the corresponding of said hollow shafts for joint rotation therewith,
at least one other of said pairs of feeding rollers is loosely mounted on said corresponding of said hollow shafts,
a control shaft received in each of said hollow shafts,
said hollow shafts have longitudinal slots in the area of said loosely mounted feeding rollers,
coupling means extending through said longitudinal slots of said hollow shafts, as well as through said control shafts, whereby said loosely mounted feeding rollers join the rotation of said hollow shaft and permit an axial displacement thereof,
a control head secured to one end of all of said control shafts and connecting the latter, and
a control means operatively connected with said control head for intermittent displacement of said control shafts and, thereby, of at least said other of said pair of shafts.
4. The apparatus, as set forth in claim 3, which includes a drive shaft,
gear means operatively connecting said drive shaft with said hollow shaft,
said drive shaft has a ball-shaped end portion,
said control means comprises a swinging disk mounted on said ball-shaped end portion and having a double flange enclosing the end portion of said drive shaft, and
said double flange is removably secured to said end portion of said drive shaft.
5. The apparatus, as set forth in claim 4, wherein
said double-flange has a curved slot, and
said end portion of said drive shaft has a bore,
a bolt extending through said bore of said drive shaft end and through said slots, and
means for releasably securing said bolts and thereby said swinging disk adjustably within the range of said curved slots, in order to adjust the swinging angle of said disk.

References Cited by the Examiner
UNITED STATES PATENTS

| | | | |
|---|---|---|---|
| 1,810,677 | 6/1931 | Pfeiffer | 83—102 X |
| 2,327,103 | 8/1943 | Gude | 83—102 X |
| 2,365,322 | 12/1944 | Ashworth | 226—179 |
| 2,473,599 | 6/1949 | Liebel | 226—179 X |
| 2,975,440 | 3/1961 | Dixon et al. | 74—22 |
| 3,029,655 | 4/1962 | Morrow | 226—192 X |

M. HENSON WOOD, JR., *Primary Examiner.*

J. N. ERLICH, *Assistant Examiner.*